Aug. 29, 1967   D. W. JEFFRIES   3,338,354
BRAKE MECHANISM HAVING COMPENSATING FEATURES
Filed May 16, 1966   3 Sheets-Sheet 1

INVENTOR
DAN W. JEFFRIES
BY Flam and Flam
ATTORNEYS.

Aug. 29, 1967  D. W. JEFFRIES  3,338,354
BRAKE MECHANISM HAVING COMPENSATING FEATURES
Filed May 16, 1966  3 Sheets-Sheet 2

INVENTOR.
DAN W. JEFFRIES
BY Flam and Flam
ATTORNEY.

INVENTOR.
DAN W. JEFFRIES
By Flam and Flam
ATTORNEYS.

United States Patent Office 3,338,354
Patented Aug. 29, 1967

3,338,354
BRAKE MECHANISM HAVING COMPENSATING
FEATURES
Dan W. Jeffries, Los Angeles, Calif., assignor of one-
half to Harold W. Nash, Los Angeles, Calif.
Filed May 16, 1966, Ser. No. 550,396
19 Claims. (Cl. 188—196)

This invention relates to a compensating brake structure of the type shown and described in my copending application Ser. No. 341,953, filed Feb. 3, 1964, and entitled Compensating Brake Structure, now U.S. Patent No. 3,277,983.

In brake structures of this character, use is made of a supplemental piston for the purpose of establishing the proper relationship between the parts so that the appropriate running clearance is obtained when the brakes are released. The basic organization consists of a pair of relatively movable piston and cylinder members, friction means yieldingly gripping one of the members, a lost motion connection between the friction means and the other member, a retraction spring urging the connection toward one limit corresponding to brake clearance, and a supplemental piston acted upon by the brake system for moving the connection toward the other limit.

In this organization, the setting of the friction means would ordinarily be disturbed if the piston were to be forced inwardly of its cylinder. This would result in excess clearance, requiring unduly large movement of the piston for the next brake engagement. The brake pedal might be floored before engagement, with possibly drastic results. Such inward movement of the piston might result from cornering or shock loads on the axle or spindle, slack in the axle or spindle bearings, or the like. In my said prior application, there is shown and described an arrangement to maintain the designed clearance even though the piston may be forced inwardly of its cylinder.

For this purpose, the limit of retracting movement of the friction means is defined by yielding rather than fixed means, and a memory spring is provided to return the parts to a normal position in the event that the piston and friction means are thrust inwardly.

One of the objects of this invention is to provide a brake system of this character in which relatively few parts are compactly packaged to make possible installation within conventional brake housings.

Another object of this invention is to provide a system of this character in which despite the compact arrangement, a substantial movement of the parts is possible during the memory stroke, and the frictional grip between the friction means and the member that it grips is actually increased by the very action of imposing a load upon the piston tending to move it inwardly of its cylinder. Accordingly it is ensured that all but virtually destructive loads can be tolerated by the system without disrupting the preset clearance relationship.

Another object of this invention is to provide a brake system of this character in which the friction means is saved from all but the slightest amount of wear. For this purpose, the friction means is automatically disengaged when the fluid pressure exceeds predetermined value, and re-engages when the fluid pressure reduces below that predetermined value. This "release" value cannot be reached unless the piston is working, that is, actually clamping the disk and flexing the housing parts. Excess clearance will have been taken up by sliding between the friction means and the piston or cylinder member. Except when excess clearance is being taken up, there is no sliding between the friction means and the member that it grips.

Another object of this invention is to provide a unique arrangement of spring elements in which at least some of the elements perform the function of both retraction and memory.

This invention possesses many other advantages, and has other objects which may be made more clearly apparent from a consideration of several embodiments of the invention. For this purpose, there are shown a few forms in the drawings accompanying and forming part of the present specification, and which drawings, unless as otherwise indicated, are true scale. These forms will now be described in detail, illustrating the general principles of the invention; but it is to be understood that this detailed description is not to be taken in a limiting sense, since the scope of the invention is best defined by the appended claims.

Referring to the drawings.

Figure 1:
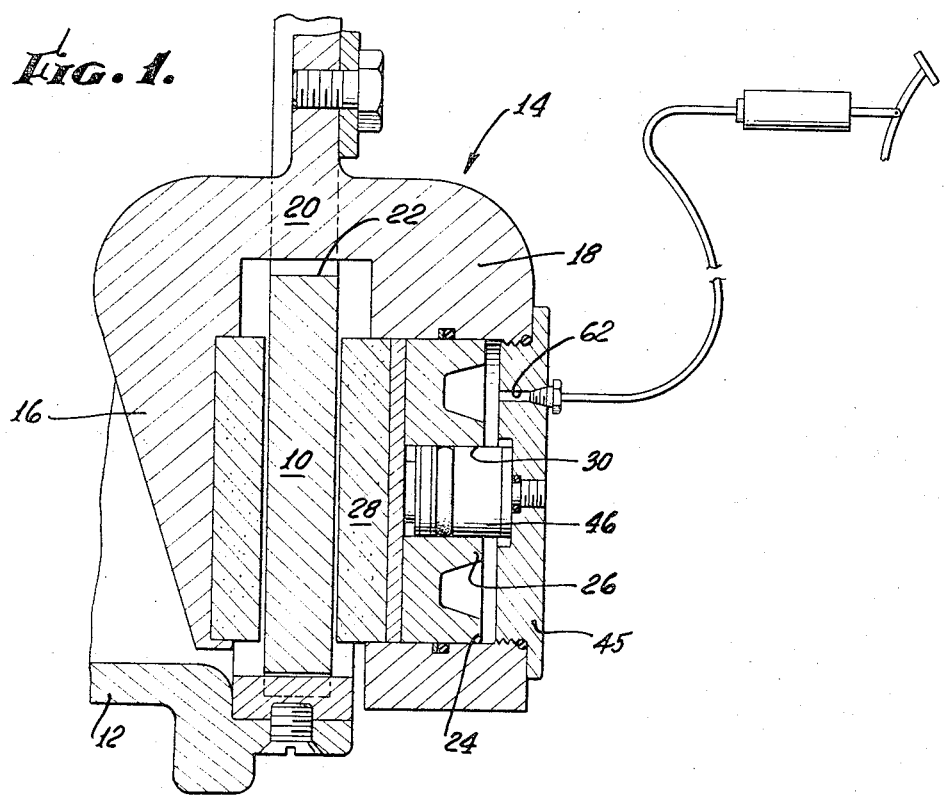
FIGURE 1 is a sectional view through a brake caliper, the section plane passing axially through one of a number of brake units mounted on the torque resolving member as well as axially of a wheel axle.

In FIG. 1 there is illustrated a rotary brake disk 10 that may be spline connected to the wheel or other rotary device 12 intended to be braked. A caliper 14, attached to the wheel axle, encompasses a segment of the disk 10. The anvil part 16 of the caliper extends on the inside of the disk 10, and another part 18 extends on the outer side of the disk, the connecting portion 20 of the caliper extending through the central aperture 22 of the brake disk.

On the outer part of the caliper part 18 one or more identical brake units are mounted in angularly spaced relationship. One of these units is illustrated. The caliper provides a cylinder 24 in which a piston 26 is slidably accommodated. Lining 28 carried by the piston is engageable with the brake disk 10.

A supplemental or compensating piston P (FIG. 2) is mounted in a central bore 30 of the main piston 26. Friction means in the form of a split ring F is peripherally mounted on the piston 26 and engages the piston bore 30. The friction ring F is positioned upon a cone 32 at the outer end of the supplemental piston P. The flange and the ring F are correspondingly tapered whereby the ring F is caused to expand as it is forced over the flange 32 thus to engage the piston bore 30. A spring washer 34 provides force for this wedging purpose. The central portion of the washer engages behind a head 36 of a nut 38 that is located adjacent the outer end of the supplemental piston P. The peripheral portion of the spring washer 34 bears against the split ring F. The spring characteristics of the washer 34 and the taper of the parts, together with the friction characteristics of the materials, determine the gripping force between the ring F and the piston 26.

The nut 38 is secured upon a screw 40 that passes through the supplemental piston. A thread seal 42 prevents passage of fluid through the supplemental piston.

The friction ring F and the supplemental piston P on which it is mounted are movable with respect to the anvil or cylinder between defined limits. A stop ring S determines the limit of advancing movement of the friction ring and the normal limit of retracting movement. The stop ring S is mounted within an internally flanged retainer 44 that is secured to a cap 45 that closes the cylinder. Thus projecting from the cap 45 is a post 46. The end 47 of the post 46 is externally threaded for cooperation with internal threads of the retainer. The flange 48 of the retainer is opposed to the end of the post 46 and defines a space in which the stop ring S is accommodated. The retainer preferably has a non-circular peripheral cross-section for cooperation with conventional wrenches. The intermediate flange of the post likewise is preferably hexagonally formed.

The stop ring S projects inwardly of the flange 48, and is in the path of rearward movement of the supplemental piston P away from the brake disk. Thus the piston P has a reduced inner end 50 defining a shoulder 52 opposed to the stop S, the end 50 passing through the stop ring S. A stack of spring washers 54, interposed between the stop ring S and the post 46, normally keeps the stop ring S against the flange 48. Hence, the stop ring S, by engagement with the shoulder 52, determines the limit of retracting movement of the friction ring F relative to the cylinder member. The spring washers have the same size aperture as the stop ring S, and likewise fit about the reduced extension 50.

When the supplemental piston P is advanced, the shoulder 52 moves away from the stop ring, and the spring washers 54 are compressed. Thus the innermost washer engages behind the head 56 of the screw 40, the head projecting radially beyond the reduced extension 50. The spring washers 54 bottom out after a very short movement corresponding to the desired brake clearance plus a certain deflection left in the housing parts when the piston and friction ring F begin their retracting movement in unison. By way of example the designed clearance may be 0.005", and the deflection may be 0.020", making a total stroke of 0.025". A force corresponding, say, to 40 p.s.i. over the main piston and the supplemental piston is all that is required to be exerted to collapse the springs 54.

In order to seal the piston bore 30, an O-ring 58 is provided that is located beyond the friction ring F about the flange 32. A backing ring 60 is interposed between the O-ring 58 and the friction ring F. This O-ring also acts as a hydraulic motor element in a manner to be hereinafter described.

Figure 2:
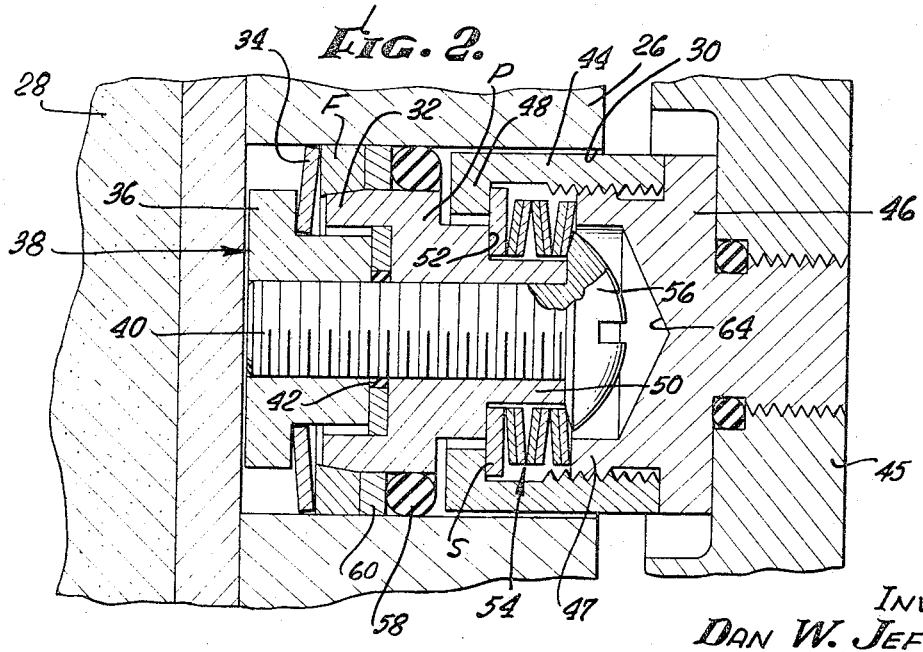
FIG. 2 is an enlarged sectional view showing the brake mechanism in detail.

Fluid is admitted to the cylinder 24 (FIG. 1) via a port 62, and is conducted to the righthand end of the bore 30, as viewed in FIG. 2. If there is much excess clearance, then the friction ring F holds the parts together and the main piston 26 and the supplemental piston P move in unison outwardly of the cylinder 24 toward brake applied position. At 40 p.s.i., the retracting spring 54 has compressed to its limit, and the further outward movement of the supplemental piston is restrained. As the pressure builds up to a feed out value of, say, 70 p.s.i., the drag of the friction ring F is overcome, and the main piston moves outwardly until it engages the lining. This feed out value must be greater than that which is necessary to collapse the spring washers 54 under excess clearance conditions. At this pressure, there is no significant housing deflection. Accordingly if the brakes would now be released without carrying the system pressure much above 70 p.s.i., the springs 54 would retract the piston through the friction ring F and cause an excess clearance of 0.025" rather than 0.005". In order to achieve the proper 0.005" clearance under these circumstances, the system pressure must be increased to a certain designed minimum operating value at which the spring washer 34 is overpowered. At this value, say 400 p.s.i., the O-ring 58 moves the friction ring F off the cone 32 to release the friction couple. At this value, the caliper deflection is 0.020". When the system pressure is again reduced below 400 p.s.i., the friction ring binds up and locks to the piston 26. As the pressure is reduced, the housing or caliper parts 18 start moving to the left relative to the supplemental piston P and the piston under the influence of the resilient forces accompanying the 0.020" deflection. This allows the springs 54 to expand until only 0.005" travel is left in the springs 54 at which time all of the deflection of the caliper parts has been removed. This pressure may be quite higher than the 40 p.s.i. required to collapse the springs 54. However, as soon as the system pressure reduces below 40 p.s.i., the springs 54 accomplish the final 0.005" of retraction.

Above 400 p.s.i., the friction ring is saved from wear while heavy braking work is being done. Consequently the life of the friction ring is so increased that it is no longer a consideration.

What happens to the elements of the brake compensator under opposite conditions of insufficient clearance may now be considered. Any force tending to move the friction ring and supplemental piston P outwardly of the stopped piston 26 causes binding due to the action of the cone 32. The force required may be of the order of 250 or 500-pound weight. Before a pressure on the supplemental piston can be developed adequate to supply this force, the friction ring F will first have moved off the cone 32. Accordingly, if there is inadequate clearance, the system pressure is elevated to 400 p.s.i. to release the supplemental piston for outward movement. As the supplemental piston P moves outwardly, the spring 54 collapses fully, and from this point the operation is the same as that previously described.

If a shock or other load is encountered that tends to move the piston 26 inwardly, the position of the friction ring will not be disturbed. Such load also tends to carry the friction ring along the cone 32 in a direction to produce increased coupling between the parts. The friction ring F transmits the load to the stop ring S and to the spring 54, thus allowing the piston and friction ring harmlessly to retract in unison against the force of the spring 54. During this movement, the stop ring S will simply move inwardly away from the flange 48. Similarly, the head 56 of the screw 40 will move away from the springs 54 and into a recess 64 of the post. Ordinary shock loads encountered will be inadequate fully to compress the springs 54. When the shock load has been removed, the springs 54 return the stop ring S against the flange 48, and the piston 26 returns to the proper position.

The springs 54 thus serve both as a return spring device and as a memory spring device.

The movement of the spring in absorbing inward shock loads is substantially greater than that corresponding to the designed brake clearance, and despite the fact that the same spring washers are used. Thus there are three spring washers 54. Yet only two of them operate during outward movement of the supplemental piston P. But all three operate between the post 46 and the stop ring S when the piston is thrust inwardly by shock load. By proper design of the third spring washer, the permitted movement of the parts due to shock loads can be controlled without affecting the desired nominal brake clearance.

Figure 3:
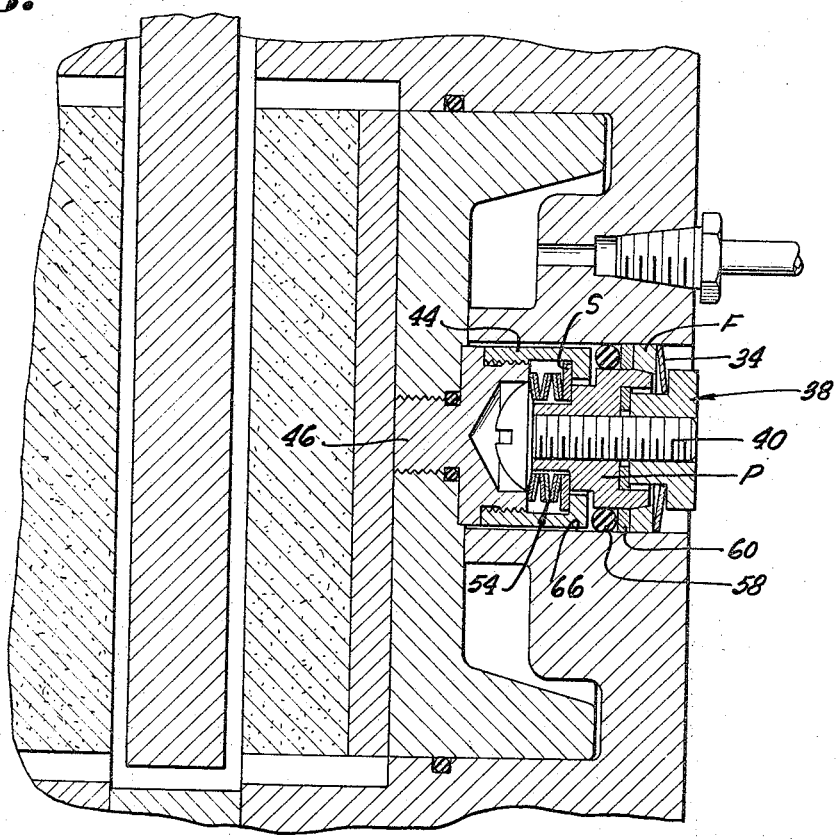
FIG. 3 is an axial sectional view similar to FIG. 2 illustrating a modified form of the present invention in which the mechanism is attached to the piston rather than the cylinder.

In the form illustrated in FIG. 3, the identical brake mechanism is provided as before except that the post 46 is attached to the center of the piston, and the cylinder instead provides a central bore 66 in which the supplemental piston P and related structure are fitted. The operation is identical.

Figure 4:
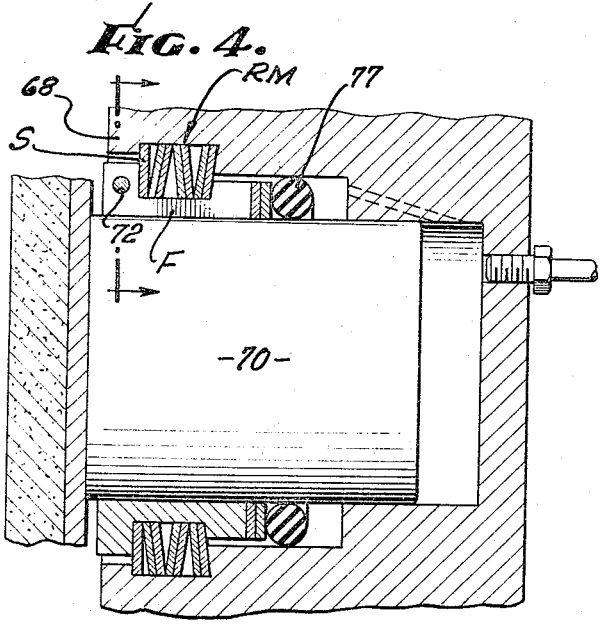
FIGS. 4 and 6 are axial sectional views similar to FIG. 2 illustrating other modified forms of the invention.
Figure 5:
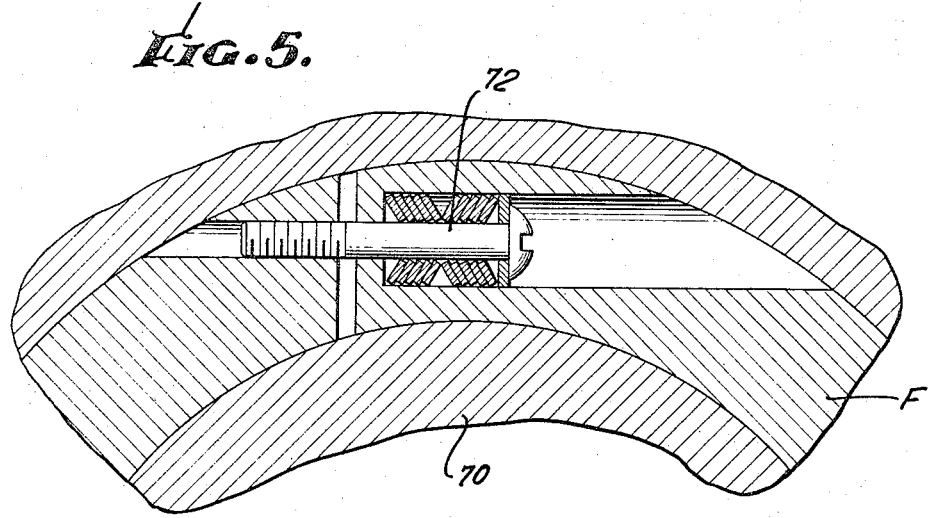
FIG. 5 is a sectional view taken along a plane corresponding to line 5—5 of FIG. 4.

In the form illustrated in FIGS. 4 and 5 the combined retraction and memory spring RM is carried peripherally of a friction ring F. The spring RM holds a stop ring S against a flange 68 secured to the cylinder. The friction ring F surrounds a piston 70, rather than the piston surrounding the friction ring. The ring F is tightened by a spring pressed screw 72 (FIG. 5). The supplemental piston P is formed by a sealing O-ring 77 and in a manner described in my prior U.S. Patent No. 3,112,014, issued Nov. 26, 1963, and entitled Compensating Brake structure. The operation of the form illustrated in FIG. 4, so far as it relates to the memory and retraction features, is the same as that of the previous forms.

Figure 6:
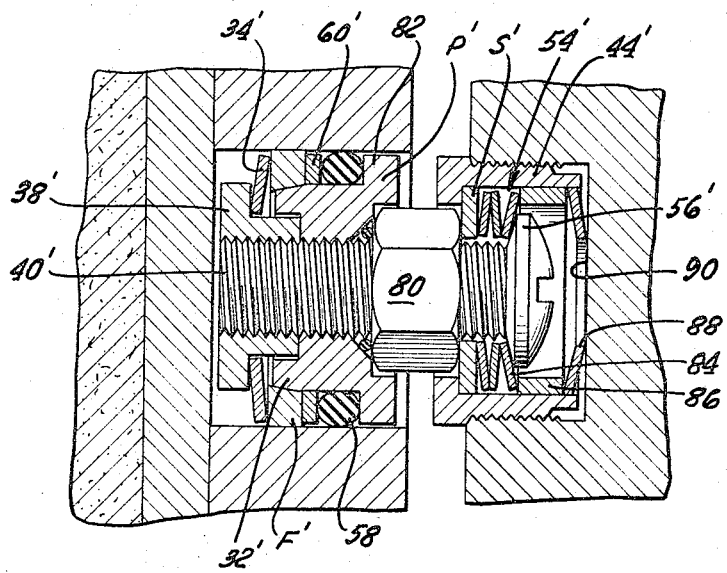

The device shown in FIG. 6 is quite similar to that illustrated in FIGS. 2 and 3, except that an increased memory stroke is provided, and the designed clearance is provided by a simple arrangement of parts.

The supplemental piston P' is mounted on a screw 40', but is clamped between a self locking nut 80 mounted on the screw 40' and a locking nut 38'. As in the form first described, the supplemental piston P' has a cone part 32' on which the friction ring F' is mounted. The O-ring 58' acts upon the friction ring F' through a backing ring 60'. A spring washer 34' normally causes the friction ring F' to seat on the cone 32'. The supplemental piston in this instance has a flange 82 that holds the O-ring 58' in place.

The stop ring S' and three spring washers 54' are confined between the head 56' of the screw 40' as before. However, the end spring washer 84 instead of contacting the housing part, engages a movable sleeve 86 guidingly accommodated in the retainer 44', and the sleeve 86 in turn engages the outer portion of a spring ring 88. The inner portion of the spring ring 88 contacts the bottom of the recess 90 in which the retainer 44' is accommodated. Accordingly, the spring ring 88 adds an extra degree of movement during the memory stroke. In this instance the retainer 44' is externally threaded for direct accommodation in the housing recess 90, and a mounting post is not required.

The operation of the apparatus shown in FIG. 6 except for the added movement on the memory stroke is the same as that of the form of FIGS. 2 and 3. The lock nut 80 has clearance to move in both directions within the flange 48' of the retainer.

Before the unit is installed, the nut 80 is first tightened to collapse the springs 54, and then backed off a fraction of a turn corresponding to the desired clearance plus the flexure of the particular housing parts at the release pressure. The lock nut 38' is then turned to secure the supplemental piston P' in place. The retainer 44' is then screwed into the housing recess.

The unit may also be installed in the piston rather than in the housing, as in FIG. 3, and with the same operation.

The inventor claims:

1. In a compensating brake structure for piston and cylinder members movable upon the application of fluid pressure between them: friction means yieldingly gripping one of said members; spring means yieldingly holding said friction means in frictional contact with said one of said members; means defining normal limits of movement of said friction means relative to the other of said members while said friction means is held in frictional contact with said one of said members; a retraction spring urging the friction means and said other member relatively toward one limit corresponding to brake clearance; a supplemental or compensating piston subject to the fluid pressure and operative to move said friction means and said other member relatively toward the other limit fluid pressure operated means for overpowering said spring means and releasing said friction means from said one member when the fluid pressure of the system reaches an operating value; said friction means yielding to permit feed out of the piston under excess clearance conditions and at a pressure substantially below said operating value but greater than that necessary to collapse said retracting spring.

2. The combination as set forth in claim 1 in which said friction means comprises a split ring; wedge means engaging the ring; said spring means urging the ring in one direction to engage the ring to cause the ring to change its diameter and more firmly to grip said one member; said wedge means operating to bind said friction means to said one member upon retraction of the piston member.

3. The combination as set forth in claim 2 in which said fluid pressure operating means comprises an O-ring that also establishes a seal between said supplemental piston and said one member.

4. A brake unit cooperable with a piston member and a cylinder member, one of said members having a cylindrical recess having an inner end exposed toward the other of said members; a supplemental piston in the recess, said supplemental piston having a peripheral surface tapered to converge in a direction outwardly of said cylindrical recess; a split friction ring mounted on said peripheral tapered surface; a spring washer carried on the outer end of said supplemental piston, and urging said friction ring inwardly on said tapered surface to cause said ring to expand to engage said recess; an O-ring located inwardly of said friction ring, and sealing said supplemental piston; a series of spring washers mounted on a part connected to said supplemental piston and confined thereon; means mounted by or formed on said other of said members and having spaced abutments normally engaging the end spring washers; the free space between said washers determining the extent of advancing movement of said supplemental piston relative to said other member; said spring washers permitting retraction of said supplemental piston relative to said other member against the force of said spring washers in response to shock type loads.

5. The combination as set forth in claim 4 in which one end spring washer is included in the group of washers operative resiliently to resist relative retracting movement of said supplemental piston, but excluded from the group of washers operative resiliently to resist relative advancing movement of said supplemental piston.

6. A brake unit cooperable with a piston member and a cylinder member, one of said members having a cylindrical recess having an inner end exposed toward the other of said members; a supplemental piston in the recess, said supplemental piston having a peripheral surface tapered to converge in a direction outwardly of said cylindrical recess; a split friction ring mounted on said peripheral tapered surface, a spring washer carried on the outer end of said supplemental piston, and urging said friction ring inwardly on said tapered surface to cause said ring to expand to engage said recess; an O-ring located inwardly of said friction ring, and sealing said supplemental piston; a series of spring washers mounted on a part connected to said supplemental piston and confined thereon; a retainer mounted by the other of said members and engaging one end spring washer; a spring operating between said other of said members and the other end spring washer and together with said spring washers permitting resilient retraction of said supplemental piston relative to said other member in response to shock type loads on said piston member.

7. In a compensating brake structure for piston and cylinder members movable upon application of fluid pressure between them: friction means yieldingly gripping one of said members; a spring device; means connected to and normally movable with the friction means as said friction means moves relative to said one of said members, and providing a pair of stops engaged by ends of said spring device; means carried by said other of said members, and providing abutments respectively engageable with said ends of said spring device; one of said abutments and one of said stops serving to store energy in said spring device upon movement of said connected means in one direction relative to said other member; the other of said abutments and the other of said stops serving to store energy in said spring device upon movement of said connected means in the other direction relative to said other member; a supplemental piston operative relatively to move said connected means and said other member in a direction corresponding to advancement of said piston member.

8. The combination as set forth in claim 7 together with fluid pressure operated means for releasing said friction means from said one member when the fluid pressure of the system reaches a predetermined value.

9. In a compensating brake structure for piston and cylinder members movable upon the application of fluid pressure between them, said piston member having a cylindrical recess; a supplemental piston in the recess and having a tapered surface; a split friction ring on said surface; a spring carried by the supplemental piston and engaging one side of said friction ring to expand said friction ring on said surface to engage said recess; an O-ring mounted on the supplemental piston and exposed to the application of fluid pressure to engage the other side of said friction ring to oppose said spring; means carried by or formed on said cylinder member defining a stop; a part carried with said supplemental piston; and a spring device interposed between said stop and said part to urge said supplemental piston in one direction corresponding to retraction of said piston member; said O-ring overpowering said spring to release said friction ring from said surface upon the application of a predetermined fluid pressure whereby said piston is then free of said friction ring; said tapered surface being oriented to cause said friction ring to bind up in said recess upon retracting movement of said piston member.

10. In a compensating brake structure for piston and cylinder members movable upon the application of fluid pressure between them, said cylinder member having a cylindrical recess; a supplemental piston in the recess and having a tapered surface; a split friction ring on said surface; a spring carried by the supplemental piston and engaging one side of said friction ring to expand said friction ring on said surface to engage said recess; an O-ring mounted on the supplemental piston and exposed to the application of fluid pressure to engage the other side of said friction ring to oppose said spring; means carried by or formed on said piston member defining a stop; a part carried with said supplemental piston; and a spring device interposed between said stop and said part to urge said supplemental piston in one direction corresponding to retraction of said piston member; said O-ring overpowering said spring to release said friction ring from said surface upon the application of a predetermined fluid pressure whereby said piston is then free of said piston ring; said tapered surface being oriented to cause said friction ring to bind up in said recess upon retracting movement of said piston member.

11. The combination as set forth in claim 9 in which the travel of said spring device corresponds to the sum of the designed clearance plus the deflection of said cylinder member when said friction means is released.

12. The combination as set forth in claim 10 in which the travel of said spring device corresponds to the sum of the designed clearance plus the deflection of said cylinder member when said friction means is released.

13. The combination as set forth in claim 9 together with means carried by or formed on said cylinder member defining a second stop engageable with said spring device to permit resiliently opposed movement of said supplemental piston and said piston member in unison rearwardly beyond a clearance position.

14. The combination as set forth in claim 10 together with means carried by or formed on said piston member defining a second stop engageable with said spring device to permit resiliently opposed movement of said supplemental piston and said piston member in unison rearwardly beyond a clearance position.

15. The combination as set forth in claim 13 in which said second stop means is itself resilient.

16. The combination as set forth in claim 14 in which said second stop means is itself resilient.

17. A compensator unit for installation with a piston and cylinder member, one of the members having a cylindrical recess; a support; a supplemental piston mounted on the support, and having a peripheral surface with a cylindrical part and a tapered part converging in one direction toward one end of the support; a split friction ring mounted on the tapered part; an O-ring mounted on the cylindrical part to engage one side of said friction ring; a spring washer mounted on the said one end of the support and engaging the other side of said friction ring; a stack of apertured spring washers mounted on the other end of said support, and confined on said support; the edges of the washers projecting radially beyond the support; and a retainer having provisions for attachment to the other of the members, and having a flange engageable behind the outer edge of the innermost spring washer.

18. The combination as set forth in claim 17 together with a spring assembly engageable with the outer edge of the outermost spring washer, and adapted to be seated in the other of said members.

19. The combination as set forth in claim 18 together with a sleeve engageable with the outer edge of the outermost spring washer; and a supplemental spring washer having an outer part with said sleeve and an inner part adapted to be seated in the other of said members.

References Cited
UNITED STATES PATENTS

| | | | |
|---|---|---|---|
| 3,112,014 | 11/1963 | Jeffries | 188—196 |
| 3,277,983 | 10/1966 | Jeffries | 188—196 |

DUANE A. REGER, *Primary Examiner.*